(12) United States Patent
Wittmann et al.

(10) Patent No.: US 9,902,816 B2
(45) Date of Patent: Feb. 27, 2018

(54) METHOD FOR EXTRACTING LIGNIN FROM BLACK LIQUOR AND PRODUCTS PRODUCED THEREBY

(71) Applicant: SUNCOAL INUDUSTRIES GMBH, Ludwigsfelde (DE)

(72) Inventors: Tobias Wittmann, Berlin (DE); Isabella Richter, Teupitz (DE)

(73) Assignee: SUNCOAL INDUSTRIES GMBH, Ludwigsfelde (DE)

( * ) Notice: Subject to any disclaimer, the term of this patent is extended or adjusted under 35 U.S.C. 154(b) by 0 days.

(21) Appl. No.: 14/911,003

(22) PCT Filed: Aug. 8, 2014

(86) PCT No.: PCT/EP2014/067134
§ 371 (c)(1),
(2) Date: Feb. 8, 2016

(87) PCT Pub. No.: WO2015/018944
PCT Pub. Date: Feb. 12, 2015

(65) Prior Publication Data
US 2016/0200754 A1    Jul. 14, 2016

(30) Foreign Application Priority Data

Aug. 9, 2013    (DE) .................. 10 2013 013 189

(51) Int. Cl.
*D21C 11/00*    (2006.01)
*C08H 7/00*    (2011.01)
*C08H 8/00*    (2010.01)

(52) U.S. Cl.
CPC .............. *C08H 6/00* (2013.01); *C08H 8/00* (2013.01); *D21C 11/0007* (2013.01)

(58) Field of Classification Search
CPC .................................................. D21C 11/0007
See application file for complete search history.

(56) References Cited

U.S. PATENT DOCUMENTS

| | | | |
|---|---|---|---|
| 3,984,362 A | 10/1976 | Sirianni et al. | |
| 5,777,086 A * | 7/1998 | Klyosov | C07G 1/00 530/500 |
| 6,572,759 B1 | 6/2003 | Nishimura | B01D 53/32 204/242 |
| 6,939,458 B1 * | 9/2005 | Nishimura | B01D 53/32 205/742 |
| 2008/0032344 A1 * | 2/2008 | Fallavollita | C08B 37/0003 435/72 |
| 2011/0179703 A1 * | 7/2011 | Gupta | C10G 1/02 44/621 |
| 2011/0294991 A1 * | 12/2011 | Lake | C07G 1/00 530/500 |
| 2012/0168101 A1 * | 7/2012 | Chen | D21C 11/00 162/16 |
| 2013/0131326 A1 * | 5/2013 | Hannus | D21C 11/0007 530/500 |
| 2013/0306553 A1 * | 11/2013 | Wittmann | C02F 9/00 210/609 |
| 2014/0054506 A1 | 2/2014 | Melin et al. | |
| 2014/0100396 A1 * | 4/2014 | DeSisto | C10K 1/024 585/242 |
| 2014/0163245 A1 * | 6/2014 | Lake | C07D 307/50 549/489 |
| 2014/0187760 A1 * | 7/2014 | Pu | C07G 1/00 530/507 |
| 2014/0200334 A1 * | 7/2014 | Lake | D21C 11/0007 530/500 |
| 2016/0208436 A1 * | 7/2016 | Hiljanen | C07G 1/00 |

FOREIGN PATENT DOCUMENTS

| | | |
|---|---|---|
| CA | 903 194 A | 6/1972 |
| CH | 318 820 A | 1/1957 |
| CN | 101045535 A | 10/2007 |
| CN | 103608514 A | 2/2014 |
| GB | 729 220 A | 5/1955 |
| WO | 2009/104995 A1 | 8/2009 |
| WO | 2010/112230 A1 | 10/2010 |
| WO | 2010/143997 A1 | 12/2010 |
| WO | 2012/091906 A2 | 7/2012 |
| WO | 2012/117161 A1 | 9/2012 |
| WO | 2012/177198 A1 | 12/2012 |
| WO | 2013/002687 A1 | 1/2013 |
| WO | 2013/070130 A1 | 5/2013 |

OTHER PUBLICATIONS

Kang et al. (Industrial and Engineering Chemistry Research, 2012, 51, 9023-9031).*
Kang et al. (Bioresource Technology, 110, 2012, 715-718).*
Libra et al. (Biofeuls, 2011, 2(1), 89-124).*
CN Office Action and Search Report dated Apr. 5, 2017 in application No. 201480045120.1.

* cited by examiner

*Primary Examiner* — Liam J Heincer
(74) *Attorney, Agent, or Firm* — Maschoff Brennan

(57) ABSTRACT

The invention relates to a method for extracting undissolved carbonized lignin from black liquor and products produced thereby. The invention further relates to the solid carbon thus extracted and the carbonized black liquor separated from said solid carbon. According to the invention black liquor from an alkaline fractionation process is subjected to a hydrothermal carbonization process, an undissolved carbonized lignin is separated from the carbonized black liquor, the remaining carbonized black liquor is fed back into the alkaline fractionation process, and the undissolved carbonized lignin is separated from the carbonized black liquor is purified.

18 Claims, 4 Drawing Sheets

METHOD FOR EXTRACTING LIGNIN FROM BLACK LIQUOR AND PRODUCTS PRODUCED THEREBY

The invention relates to a method for extracting undissolved carbonized lignin from black liquor and products produced thereby. In addition, the invention relates to the undissolved carbonized lignin thus extracted and also to the carbonized black liquor separated off therefrom.

DEFINITIONS

Black Liquor:
In the present case, black liquor is a lignin-containing liquid that occurs as waste liquor in an alkaline fractionation process for biomass, e.g. in a KRAFT process, or in a potassium hydroxide process. The pH of the black liquor is in the alkaline range, generally a pH of 12-14.

Black liquor, in addition to lignin, can also contain further organic and inorganic components. It is characteristic of black liquor that the lignin fraction of the organic dry matter is above 50%, in particular above 60%, or even above 70%, and therefore markedly above the lignin fraction of biomass from wood that is at 15%-35%. Lignin fraction hereinafter is taken to mean the sum of Klason lignin and acid-soluble lignin.

Black liquor is hereinafter also termed lignin-containing liquid.

Stabilized Lignin:
Lignin that has been subjected to a hydrothermal carbonization by the method according to the invention at a temperature in a range from about 150° C. to about 280° C., preferably at between 230° C. and 260° C., is hereinafter termed stabilized lignin. The stabilized lignin is also termed carbonized lignin.

For the sake of simplicity, lignin that is converted to carbonized lignin during the hydrothermal carbonization is only termed carbonized lignin after completion of the hydrothermal carbonization. Lignin that is converted to carbonized lignin during the hydrothermal carbonization is termed lignin.

Carbonized Black Liquor:
Liquid that contains the carbonized lignin after the hydrothermal carbonization, wherein the carbonized lignin can be present in the liquid either dissolved and/or as a filterable solid or solid carbon, is termed hereinafter carbonized black liquor. Even after the undissolved carbonized lignin has been separated off from the carbonized black liquor, the latter is still termed carbonized black liquor.

For the sake of simplicity, black liquor that is converted to carbonized black liquor during the hydrothermal carbonization is first termed carbonized black liquor after completion of the hydrothermal carbonization. Black liquor that is converted to carbonized black liquor during the hydrothermal carbonization is termed black liquor.

Dissolved Lignin/Dissolved Carbonized Lignin:
Lignin is termed hereinafter lignin dissolved in the black liquor or carbonized lignin dissolved in the carbonized black liquor if it cannot be separated off from the black liquor or the carbonized black liquor by a filtration by means of a filter paper having a pore size of <10 μm.

Undissolved Lignin/Undissolved Carbonized Lignin:
Lignin is termed hereinafter lignin that is undissolved in the black liquor or carbonized lignin that is undissolved in the carbonized black liquor if it can be separated off from the black liquor or the carbonized black liquor by a filtration by means of a filter paper having a pore size of <10 μm or by means of centrifugation or decantation. Undissolved carbonized lignin is also termed solid carbon hereinafter.

Solid Carbon:
In the present case a solid carbon is an undissolved carbonized lignin. It is characteristic of the solid carbon that the fraction of the chemical element carbon, based on the organic dry matter, is not 100% or approximately 100%. In addition to the chemical element carbon, the chemical elements oxygen and hydrogen, and also other chemical elements, are also present in the solid hereinafter termed solid carbon.

Precipitation of Dissolved Lignin/Precipitation of Dissolved Carbonized Lignin:
Precipitation is hereinafter taken to mean a predominant transfer of more than 50%, preferably more than 60%, particularly preferably more than 70%, of the dissolved lignin or dissolved carbonized lignin to undissolved lignin or undissolved carbonized lignin. For example, solid carbon can be extracted by precipitation of dissolved carbonized lignin.

Dry Matter:
The dry matter is the evaporation residue of a liquid extracted from evaporation at ambient pressure at 105° C. to constant weight.

Organic Dry Matter:
The organic dry matter is the dry matter minus the ash remaining on ashing at 815° C. to constant weight.

Yield of the Undissolved Carbonized Lignin:
Yield of the solid carbon or of the undissolved carbonized lignin is taken hereinafter to mean the quotient of the organic dry matter of the undissolved carbonized lignin (numerator) and the organic dry matter of the black liquor (denominator). The organic dry matter of the undissolved carbonized lignin is determined after separation off thereof from the carbonized black liquor. The organic dry matter of the black liquor is determined before the feed thereof to the method according to the invention.

Grain Size Distribution:
Grain size distribution is taken to mean hereinafter the Q3 distribution. Measurement of the grain size distribution of the lignin or of the carbonized lignin proceeds in a suspension by means of laser diffraction without prior drying of the lignin or of the carbonized lignin. Before and/or during the measurement of the grain size distribution, the sample that is to be measured is dispersed with ultrasound until a grain size distribution stable over a plurality of measurements is obtained.

Colloidal (Undissolved) Carbonized Lignin:
Colloidal (undissolved) carbonized lignin is to be taken to mean hereinafter a suspension of undissolved carbonized lignin in a liquid, wherein the undissolved carbonized lignin does not form a sediment at a dry matter fraction of >1% in the liquid, but is homogeneously distributed therein. The homogeneous distribution of the undissolved carbonized lignin in the liquid is achieved by a sufficiently high polarity of the solid carbon particles. The D90 of the particle size distribution of the colloidal carbonized lignin is generally less than 60 μm and the D50 is generally less than 20 μm. With sufficient dispersion using ultrasound, the D90 of the particle size distribution of the colloidal carbonized lignin is generally less than 30 μm, the D50 is generally less than 10 μm. The grain size distribution of the colloidal carbonized lignin is generally unimodal.

Sediment of Undissolved Carbonized Lignin:
  A sediment of undissolved carbonized lignin forms when the polarity and/or the particle size distribution of the undissolved carbonized lignin is such that at least 90% of the undissolved carbonized lignin forms a sediment layer under the action of gravity within a maximum of 5 minutes.
  Fine sediment of undissolved carbonized lignin is to be taken to mean hereinafter that the D90 of the particle size distribution is below 1000 μm.
  Coarse sediment is to be taken to mean hereinafter that the D90 of the particle size distribution is above 1000 μm.
Off-gas from the Hydrothermal Carbonization:
  Off-gas from the hydrothermal carbonization is taken to mean hereinafter the non-condensable gas that is formed during a hydrothermal carbonization. The off-gas generally consists of at least 90 vol.-% (volume percent) carbon dioxide.

DESCRIPTION

Black liquor occurs as a by-product of alkaline fractionation processes of woody biomass, e.g. wood, straw, woody grass, etc. During a fractionation process, the lignin present in the woody biomass is brought into solution under alkaline conditions typically at temperatures up to 170° C. and then separated off from the components of the woody biomass that are insoluble under these conditions. An example of such an alkaline fractionation process is the production of chemical pulp by the KRAFT method in a chemical pulp factory. In addition to the dissolved lignin, black liquor contains further organic components and the predominant fraction of cooking chemicals used in the fractionation process. These are generally recovered in what is termed the chemical recovery of the fractionation process. The chemical recovery from the black liquor proceeds in the prior art substantially in two steps, wherein at first an evaporation and thus associated therewith a concentration of the dry matter content of the black liquor proceeds. Subsequently, the lignin fraction of the black liquor is combusted in a recovery boiler and the combustion residues are treated and the cooking chemicals present therein are thus recovered. The energy released in the combustion of the lignin fraction is used for heat and electricity generation.

In some chemical pulp factories, the recovery boilers operate at their maximum possible performance limit, in such a manner that a further capacity increase of the chemical pulp factory can only be achieved by installing a new recovery boiler or reducing the amount in the black liquor of the lignin that is to be combusted, e.g. by separating off the lignin from the black liquor.

Lignin can be separated off from black liquor before combustion thereof, for example by precipitating the lignin by means of gases having an acidic reaction with the black liquor, organic or inorganic acids followed by a solid-liquid separation. The crude lignin thus extracted, on account of impurities that are still present, in particular owing to the cooking chemicals, has an ash fraction of 15 percent by mass to 30 percent by mass (15 mass %-30 mass %) and must generally be disposed of as waste material. It has turned out that this crude lignin, by means of a further wash, for example with an acid, can be freed from inorganic impurities to the extent that it can, for example, be used as fuel in cement factories or energy generation plants.

Typically, however, lignin is not separated off from the total amount of black liquor which occurs in an alkaline fractionation process. Rather, of the total amount of black liquor that occurs, only as much black liquor is fed to a method for separating off lignin as is required to achieve a required relief of the recovery boiler. In an alternative approach, as a maximum, as much black liquor is fed to the method for separating off lignin such that, in the recovery boiler, from the remaining black liquor, still sufficient energy can be extracted for operation thereof.

In an optimized two-step method according to this teaching (LignoBoost method), the pH of the black liquor is first lowered slightly to about 9.5-10.5 by means of carbon dioxide and some of the lignin is precipitated in the course of this. Subsequently, lignin and black liquor are separated from one another in a mechanical dewatering. The black liquor that is only slightly reduced in pH is conducted, after the precipitated lignin has been separated off, back to the chemical pulp factory. The mechanically dewatered lignin is resuspended with water and the pH of the suspension is adjusted to about 2 using sulfuric acid. The suspension is then mechanically dewatered, the filter cake that forms is washed with acidic wash water and in this manner an ash content in the filter cake of below 5 mass % is reached. The filtrate from the second mechanical dewatering is generally recirculated to the chemical pulp factory in order to be able to recover the cooking chemicals present therein. The wash water is generally used to produce the suspension after the first dewatering. An advantage of such an optimized method procedure is ensuring an optimum recirculability of the black liquor after the precipitated lignin is separated off owing to the only slight acidification in the first method step and also the low ash content of the lignin after the acid wash in the second method step, which permits the lignin to be marketed, e.g. as fuel. The consequences of integrating such a method on the balance of the cooking chemicals of the chemical pulp factory are a disadvantage, in particular when the filtrate from the second dewatering step and therefore the sulfur present therein, are recirculated to the chemical pulp factory. Also, the high operating costs that are caused by using carbon dioxide and the necessity for separating off the sulfur introduced with the sulfuric acid, and also the low revenues which can be earned when using lignin as fuel, are disadvantageous. This prior art is given, for example, in WO 2013/070130 A1, WO 2013/002687 A1, WO 2012/177198 A1, WO 2010/143997 A1 or WO 2009/104995 A1.

For further treatment of the lignin that is separated off from the black liquor and purified by the abovedescribed optimized two-step method to give a value-added solid carbon, it is suitable to feed the purified lignin to a hydrothermal carbonization and thus refine it to give a solid carbon.

According to the prior art, organic material is treated in a hydrothermal carbonization at temperatures between 150° C. and 300° C. in the presence of liquid water and at a pressure which is above the saturated vapor pressure for a time from 30 minutes to 24 hours. The reaction water, before the start of the hydrothermal carbonization, generally has a neutral pH or an acid pH by addition of an acid. After completion of a hydrothermal carbonization, the pH is markedly in the acid range. According to the prior art, a hydrothermal carbonization is catalyzed by the addition of acids, e.g. citric acid. The acids forming from the biomass during a hydrothermal carbonization also act autocatalytically. The result of a hydrothermal carbonization is a solid carbon which has an increased carbon content and a reduced oxygen content in comparison with the starting material (WO 2010/112230 A1).

In experiments it has now been found that lignin that is extracted from black liquor by the abovedescribed two-step method (LignoBoost method), which is subjected as feedstock to a hydrothermal carbonization, forms during this solid deposits on the reaction vessel used that hinder a production operation or make it impossible. A further disadvantage of a hydrothermal carbonization of the lignin extracted from black liquor by the prior art is the expenditure on plants which results from the combination of the two-step precipitation and purification method with a hydrothermal carbonization of the prior art.

Direct hydrothermal carbonization of black liquor is not prior art. In the closest prior art (WO 2012/091906 A1), it is proposed to treat black liquor hydrothermally at a temperature between 250° C. and 300° C. and thus to reduce the water-insoluble fraction of solids by at least 40%. The aim of this prior art is to depolymerize the lignin in the black liquor by a hydrothermal treatment in order to be able to separate off the resultant water-soluble phenolic oligomers and monomers readily from solids by filtration and to be able to feed them as feedstock to subsequent chemical processes. This prior art, in the result, does not separate off the lignin from the black liquor.

It is an object of the invention to overcome the disadvantages of the prior art in separating off lignin from black liquor.

The object is achieved in particular by the methods of claims 1 and 14.

The basic concept of these methods is that
black liquor from an alkaline fractionation process is subjected to a hydrothermal carbonization,
from the carbonized black liquor an undissolved carbonized lignin is separated off,
the remaining carbonized black liquor is returned to the alkaline fractionation process and
the undissolved carbonized lignin separated off from the carbonized black liquor is purified.

A method according to the invention as claimed in claim 1 by means of which lignin is separated off from black liquor provides in this case
to subject black liquor from an alkaline fractionation process having a dry matter content of at least 20 mass % in a first process step (hydrothermal carbonization) to a hydrothermal carbonization, wherein
the pH of the black liquor, before or during the hydrothermal carbonization, or the pH of the carbonized black liquor after the hydrothermal carbonization, is reduced to the extent that undissolved carbonized lignin is extracted with a yield of at least 20 mass %, and
the pH of the black liquor, before and during the hydrothermal carbonization, and the pH of the carbonized black liquor after the hydrothermal carbonization, are at least 7,
undissolved carbonized lignin in a second process step (dewatering) is substantially separated off from the carbonized black liquor and the carbonized black liquor is fed back to the alkaline fractionation process,
the inorganic components of the undissolved carbonized lignin separated off from the carbonized black liquor are reduced in a third process step (purification) by a wash and
the undissolved carbonized lignin is extracted with a dry matter content of greater than 40 mass %.

In the context of a method according to the invention, therefore black liquor is subjected to a hydrothermal carbonization, an undissolved carbonized lignin is separated off from the carbonized black liquor and subsequently freed from inorganic impurities, wherein, by adjusting the pH, a yield of the undissolved carbonized lignin of above 20 mass % is achieved. In this case, of course, it can be provided that the pH of the black liquor before and/or during the hydrothermal carbonization and/or the pH of the carbonized black liquor after the hydrothermal carbonization is reduced to the extent that undissolved carbonized lignin is extracted with a yield of at least 20 mass %. A targeted reduction of the pH can therefore be performed, in particular before, during and after the hydrothermal carbonization.

By a method according to the invention, lignin can be separated off from black liquor and upgraded to a solid carbon in the form of undissolved carbonized lignin, wherein a high yield is achieved. By this means, separating off lignin from black liquor is markedly simplified in comparison with the prior art. For example, lignin can be separated off and upgraded to a solid carbon or undissolved carbonized lignin at a pH above 7. In addition, by employing the method according to the invention, the quality of the undissolved carbonized lignin can be affected, in particular the grain size distribution thereof, the fraction of the chemical element carbon of the organic dry matter of the undissolved carbonized lignin, or the softening temperature of the undissolved carbonized lignin. Furthermore, on the basis of the method according to the invention, the undissolved carbonized lignin may be cleaned of inorganic components.

According to the prior art, lignin cleaned of inorganic components can only be extracted on an industrial scale by what is termed the LignoBoost method (see above). It is characteristic of the LignoBoost method that separating off and purifying the lignin proceeds in two steps, wherein, in a first step, the lignin is precipitated out of the black liquor and separated off therefrom and, in a second step, the lignin that is separated off is resuspended in a liquid and by adding sulfuric acid a pH of 2-4 is established. The resuspended lignin is then separated off from the liquid and washed with an acid.

The present method according to the invention simplifies considerably the prior art, in particular, it is not the lignin extracted in the abovedescribed two-step precipitation and purification process that is fed to a hydrothermal carbonization, but rather the black liquor. In addition, the method according to the invention differs from the prior art in that the hydrothermal carbonization is neither catalyzed by establishing an acid pH of <7, nor in that, via autocatalysis a pH of <7 is achieved during the hydrothermal carbonization. According to the invention, the pH of the black liquor, before and during the hydrothermal carbonization, and the pH of the carbonized black liquor after the hydrothermal carbonization is at least 7, as a result of which an alkaline hydrothermal carbonization proceeds.

In an embodiment variant, it is provided that the pH of the black liquor before and during the hydrothermal carbonization and the pH of the carbonized black liquor after the hydrothermal carbonization are at least 8.

Alternatively, or in supplementation, it can be provided that the undissolved carbonized lignin is substantially separated off from the carbonized black liquor in a second process step (dewatering) at a pH of at least 7—in a variant at a pH of at least 8—and the carbonized black liquor is fed back to the alkaline fractionation process.

The method according to the invention can be improved in that the hydrothermal carbonization is carried out at a temperature between 180° C. and 300° C., preferably in a range from about 200° C. and about 280° C. In a variant, the hydrothermal carbonization is carried out in a range from about 210° C. to about 270° C., preferably between 230° C. and 260° C.

In an exemplary embodiment, the period of the hydrothermal carbonization is between 60 and 600 minutes, preferably between 60 and 300 minutes, in a further development it is in a range from 120 to 240 minutes.

In a method variant, the black liquor is fed to the first process step at a dry matter content of at least 25 mass %, in a further development, at a dry matter content of at least 30 mass %. Preferably, the dry matter content of the black liquor that is fed to the first process step is limited to a value of 50 mass %.

The period of the hydrothermal carbonization can be selected in such a manner that the pH of the carbonized black liquor is below the pH of the black liquor before the hydrothermal carbonization by at least half a unit, preferably by at least one unit. In an embodiment variant, the period of the hydrothermal carbonization is selected in such a manner that the pH of the carbonized black liquor is below the pH of the black liquor before the hydrothermal carbonization by at least 1.5 units, preferably by at least 2 units.

Alternatively, or as a supplement, the temperature of the hydrothermal carbonization can be selected in such a manner that the pH of the carbonized black liquor is below the pH of the black liquor before the hydrothermal carbonization by at least half a unit. In an embodiment variant, the temperature of the hydrothermal carbonization is selected in such a manner that the pH of the carbonized black liquor is below the pH of the black liquor before the hydrothermal carbonization by at least one unit, or even by at least 1.5 units. In a further development, the temperature of the hydrothermal carbonization is selected in such a manner that the pH of the carbonized black liquor is below the pH of the black liquor before the hydrothermal carbonization by at least two units.

In a further embodiment variant, both the period and the temperature of the hydrothermal carbonization are selected and matched to one another in such a manner that the pH of the carbonized black liquor is below the pH of the black liquor before the hydrothermal carbonization by the abovementioned values.

In addition, it can be provided that the pH of the black liquor is lowered before the hydrothermal carbonization. In this case, for example, a pH below 12, preferably a pH below 11, or even below 10 is established. However, preferably, the pH will preferably not fall below 9. For lowering the pH, e.g. a gas having an acid reaction with the black liquor, for example carbon dioxide and/or off-gas from the hydrothermal carbonization, can be used.

In addition, it can be provided that the pH of the carbonized black liquor is lowered before the second process step. In this case, for example a pH of below 10, preferably a pH below 9 is established. However, in a variant, the pH will not fall below 7, preferably 8. For lowering the pH, e.g. a gas having an acid reaction with the carbonized black liquor, for example carbon dioxide and/or off-gas from the hydrothermal carbonization, can be used. Alternatively, or as a supplement, an acid such as, e.g., sulfuric acid, can also be used.

If, in addition to the lignin, other organic polymers, for example biomass, such as wood, straw, grass, etc., cellulose, hemicellulose and/or the breakdown products thereof, e.g. glucose, etc., are present in the black liquor, then from these organic polymers and the breakdown products thereof, during the hydrothermal carbonization, organic acids are formed that effect a lowering of the pH during the hydrothermal carbonization. In this context, it can be provided that, in an embodiment variant, the pH is lowered during the hydrothermal carbonization by increasing the fraction of biomass such as wood, straw, grass, cellulose, hemicellulose and/or the breakdown products thereof in the black liquor before and/or during the hydrothermal carbonization, wherein, however, the pH does not fall below 7, preferably 8.

In an embodiment variant, as an alternative, or in supplementation, to the abovementioned features, it is provided that the pH of the black liquor falls by at least one unit and at most to a pH of 8 during the hydrothermal carbonization.

A variant of the method according to the invention can, in addition, provide that a defined grain size distribution of the undissolved carbonized lignin is obtained by setting the pH of the black liquor before and/or during the hydrothermal carbonization in such a manner that after the hydrothermal carbonization either a colloidal carbonized lignin or a sediment of carbonized lignin is extracted.

In an exemplary embodiment, an ash fraction of the undissolved carbonized lignin is lowered to a maximum of 10 mass % by the wash in the third process step. In a further development, the ash fraction in this case is lowered to a maximum of 7 mass %, preferably to a maximum of 5 mass %. The undissolved carbonized lignin can be washed for this in the third process step with a liquid, preferably with water or an acid, in particular with sulfuric acid. Accordingly, the undissolved carbonized lignin can be washed in the third process step with a liquid and an ash fraction of the undissolved carbonized lignin can be lowered in this manner to a maximum of 10 mass %, in a further development to a maximum of 7 mass %, preferably to a maximum of 5 mass %.

In an exemplary embodiment, the pH of the (wash) liquid used for purifying the undissolved carbonized lignin is at least 7, preferably at least 8, after the purification of the undissolved carbonized lignin in the third process step.

The pH of the (wash) liquid used for purifying the undissolved carbonized lignin in the third process step differs, in an exemplary embodiment, by a maximum of half a unit from the pH of the carbonized black liquor before the second process step.

Alternatively, or in supplementation, the pH of the (wash) liquid used for purifying the undissolved carbonized lignin in the third process step differs by a maximum of half a unit from the pH of the undissolved carbonized lignin after the second process step. The pH of the undissolved carbonized lignin after the second process step can be measured, for example, in a 10% strength suspension of a sample of the undissolved carbonized lignin with distilled water.

The above-cited variants of a method according to the invention can, of course, also be combined among one another.

Hereinafter, by way of example, further possible embodiments of the method according to the invention are disclosed, each of which can be combined with the abovementioned variants and features.

An embodiment of the method according to the invention is characterized, for example, in that the alkaline fractionation process from which the black liquor originates and to which the carbonized black liquor is fed back is used for producing chemical pulp in a chemical pulp factory.

Against this background, according to a further aspect of the invention, a method according to claim 14 is proposed that likewise achieves the same object. In this case it is provided that black liquor having a dry matter content of at least 20 mass % from a chemical pulp factory is subjected in a first process step (hydrothermal carbonization) to a hydrothermal carbonization at a temperature between 180° C. and 300° C. for at least 60 minutes and for a maximum of 600 minutes, wherein
the pH falls by at least one unit and at most to a pH of 8 during the hydrothermal carbonization and
in this case undissolved carbonized lignin (or a solid carbon) precipitates out of the black liquor at a yield of at least 20 mass %,
the undissolved carbonized lignin in a second process step (dewatering) is substantially separated off from the carbonized black liquor,
the carbonized black liquor is fed back to the chemical pulp factory,
the inorganic components of the undissolved carbonized lignin separated off from the carbonized black liquor are reduced in a third process step (purification) by a wash and
the undissolved carbonized lignin is extracted with a dry matter content of more than 40 mass %.

The advantages and features cited in connection with a method according to the invention according to the first aspect of the invention are in this case also substantially combinable and achievable with a method according to the second aspect, and so reference is made to the details hereinbefore.

In an embodiment of a method according to the invention, the third process step is implemented within the second process step, preferably in a belt press, chamber filter press or membrane filter press, as filter cake wash (purification in one step).

Such an embodiment of a method according to the invention for separating off lignin from black liquor from an alkaline fractionation process is then characterized in particular in that
black liquor having a dry matter content of at least 20 mass % is subjected in a first process step (hydrothermal carbonization) to a hydrothermal carbonization, wherein
the pH of the black liquor, before or during the hydrothermal carbonization, or the pH of the carbonized black liquor after the hydrothermal carbonization, is reduced to the extent that undissolved carbonized lignin is extracted with a yield of at least 20 mass %, and the pH of the black liquor, before and during the hydrothermal carbonization, and the pH of the carbonized black liquor after the hydrothermal carbonization, are at least 7, preferably at least 8,
the undissolved carbonized lignin is substantially separated off from the carbonized black liquor in the second process step (dewatering) at a pH of at least 7, preferably at least 8, wherein a filter cake is extracted, and the carbonized black liquor is fed back to the alkaline fractionation process,
the inorganic components of the undissolved carbonized lignin separated off from the carbonized black liquor are reduced in a third process step (purification) by a directly subsequent filter cake wash, and
undissolved carbonized lignin is extracted with a dry matter content of greater than 40 mass %.

It is an advantage of this embodiment that, to implement the second and third process step, only one plant/machine need be provided. This embodiment therefore differs, for example, from the prior art in that separating off the lignin proceeds in one method step. In particular, resuspending the undissolved carbonized lignin separated off from the carbonized black liquor in the second process step is dispensed with.

In another preferred embodiment of a method according to the invention, the third process step is implemented subsequently to the second process step (purification in two steps).

In this case, then, for example
a filter cake discharged from the second process step and consisting of undissolved carbonized lignin (or solid carbon) and carbonized black liquor that is not separated off is mixed with a wash liquid and washed therewith,
the washed undissolved carbonized lignin is subsequently separated again from the wash liquid and
optionally the filter cake thus extracted, before the discharge from the third process step, is further freed from inorganic components in a filter cake wash.

This embodiment can be further developed in that
a filter cake discharged from the second process step and consisting of undissolved carbonized lignin (or solid carbon) and carbonized black liquor that is not separated off is mixed with a wash liquid, preferably with an acid, and washed therewith,
the washed undissolved carbonized lignin is subsequently again separated from the wash liquid, preferably by a belt press, chamber filter press or membrane filter press, and
optionally, the filter cake thus extracted, before the discharge from the third process step, is further freed from inorganic components in a filter cake wash, preferably with water or an acid.

An embodiment of the method according to the invention is, for example, characterized in that
black liquor from the alkaline fractionation method having a dry matter content of at least 20 mass % is subjected in a first process step (hydrothermal carbonization) to a hydrothermal carbonization, wherein
the pH of the black liquor before the hydrothermal carbonization is reduced to the extent that lignin precipitates out of the black liquor,
the pH of the black liquor, optionally, furthermore, during, or the pH of the carbonized black liquor after, the hydrothermal carbonization, is reduced to the extent that undissolved carbonized lignin is extracted with a yield of at least 20 mass % and the pH of the black liquor before and during hydrothermal carbonization and the pH of the carbonized black liquor after the hydrothermal carbonization are at least 7, preferably at least 8,
the undissolved carbonized lignin in a second process step (dewatering) is substantially separated off from the carbonized black liquor at a pH of at least 7, preferably at least 8, and the carbonized black liquor is fed back to the alkaline fractionation method,
the inorganic components of the undissolved carbonized lignin separated off from the carbonized black liquor are reduced in a third process step (purification) by a wash and
the undissolved carbonized lignin is extracted with a dry matter content of greater than 40 mass %.

In this embodiment of the method according to the invention, the lignin which is first present dissolved in the black liquor is precipitated out and then fed to the hydrothermal carbonization. Here also, the black liquor is waste lye from an alkaline fractionation method. This embodiment of the method according to the invention therefore contains a precipitation step before the hydrothermal carbonization in which the pH of the black liquor is lowered to the extent that lignin precipitates out therefrom, preferably at a pH between 9.5 and 10.5. To lower the pH, acids or gases that have an acid reaction with the black liquor can be used. Preferably, $CO_2$ and/or off-gas from the hydrothermal carbonization is used for lowering the pH.

Another embodiment of the method according to the invention is, for example, characterized in that
- black liquor having a dry matter content of at least 20 mass % is subjected in a first process step (hydrothermal carbonization) to a hydrothermal carbonization, wherein
- the pH of the black liquor before the hydrothermal carbonization is such that, or is adjusted such that, lignin is dissolved in the black liquor,
- the pH of the black liquor during the hydrothermal carbonization or pH of the carbonized black liquor after the hydrothermal carbonization is reduced to the extent that undissolved carbonized lignin is extracted with a yield of at least 20 mass % and the pH of the black liquor, before and during the hydrothermal carbonization, and the pH of the carbonized black liquor after the hydrothermal carbonization, is at least 7, preferably at least 8,
- the undissolved carbonized lignin in a second process step (dewatering) is substantially separated off from the carbonized black liquor at a pH of at least 7, preferably at least 8, and the carbonized black liquor is fed back to the alkaline fractionation method,
- the inorganic components of the undissolved carbonized lignin separated off from the carbonized black liquor are reduced in a third process step (purification) by a wash and
- the undissolved carbonized lignin is extracted with a dry matter content of greater than 40 mass %.

In this embodiment of the method according to the invention, the lignin is dissolved in the black liquor before the hydrothermal carbonization. Here also, the black liquor is waste lye from an alkaline fractionation method. Lignin that is not dissolved in the black liquor can first be brought into solution by increasing the pH and then be fed as dissolved lignin to the hydrothermal carbonization. The dissolved lignin, in this embodiment, is precipitated out at least in part during the hydrothermal carbonization. After the hydrothermal carbonization, a further precipitation of the carbonized lignin still dissolved in the carbonized black liquor can proceed, wherein the pH does not fall below 7, preferably 8.

A variant of the method according to the invention can further provide that the yield of at least 20 mass % of undissolved carbonized lignin is at least 50%, for example at least 60%, preferably at least 70%, achieved during the hydrothermal carbonization. This can be achieved by extracting at least 50%, preferably at least 60%, of the undissolved carbonized lignin separated off in the second process step from the carbonized black liquor from the lignin dissolved in the black liquor during the hydrothermal carbonization. In this case—as described hereinbefore—the period and/or temperature and/or lowering of the pH of the black liquor before and/or during the hydrothermal carbonization is selected and set in such a manner that the yield of at least 20 Mass % of undissolved carbonized lignin is at least 50%, for example at least 60%, preferably at least 70%, achieved during the hydrothermal carbonization. In particular, such an embodiment therefore provides, in summary,
- subjecting black liquor from an alkaline fractionation process having a dry matter content of at least 20 mass % in a first process step (hydrothermal carbonization) to a hydrothermal carbonization, wherein
- the pH of the black liquor before, during or of the carbonized black liquor after, the hydrothermal carbonization is reduced to the extent that undissolved carbonized lignin is extracted with a yield of at least 20 mass %,
- the pH of the black liquor before, during and of the carbonized black liquor after, the hydrothermal carbonization is at least 7, and
- at least 50%, for example at least 60%, preferably at least 70%, of the yield of the undissolved carbonized lignin is achieved during the hydrothermal carbonization,
- undissolved carbonized lignin in a second process step (dewatering) is substantially separated off from the carbonized black liquor and the carbonized black liquor is fed back to the alkaline fractionation process,
- the inorganic components of the undissolved carbonized lignin separated off from the carbonized black liquor are reduced in a third process step (purification) by a wash and
- the undissolved carbonized lignin is extracted with a dry matter content of greater than 40 mass %.

Hereinafter, by way of example, two further alternative exemplary embodiments are disclosed for a method according to the invention.

Thus, a method can be provided for separating off lignin from black liquor in which
- black liquor having a dry matter content of at least 20 mass % is subjected in a first process step (hydrothermal carbonization) to a hydrothermal carbonization, wherein
- the pH of the black liquor, before or during the hydrothermal carbonization, or the pH of the carbonized black liquor after the hydrothermal carbonization, is reduced to the extent that undissolved carbonized lignin is extracted with a yield of at least 20 mass % and
- the grain size distribution of the undissolved carbonized lignin after adaptation of the pH of the black liquor before and/or during the hydrothermal carbonization is adjusted in such a manner that a colloidal solid carbon or colloidal undissolved carbonized lignin forms, wherein the pH of the black liquor before and during the hydrothermal carbonization does not fall below 10, and the carbonized black liquor after the hydrothermal carbonization has at least a pH of 7, preferably 8,
- the undissolved carbonized lignin in a second process step (dewatering) is substantially separated off from the carbonized black liquor at a pH of at least 7, preferably at least 8, and the carbonized black liquor is fed back to the alkaline fractionation method,
- the inorganic components of the undissolved carbonized lignin separated off from the carbonized black liquor are reduced in a third process step (purification) by a wash and
- the undissolved carbonized lignin is extracted with a dry matter content of greater than 40 mass %.

In this embodiment variant, by adjusting the pH of the black liquor, a colloidal undissolved carbonized lignin forms. For this purpose, the pH before and during the hydrothermal carbonization is $>=10$. Adjusting the pH means that polymerization of the lignin during the hydrothermal carbonization is suppressed. In addition, the particle size distribution and the functional groups of the carbonized lignin are arranged in such a manner that a colloidal undissolved carbonized lignin forms. Preferably, the colloidal undissolved carbonized lignin is separated off from the carbonized black liquor by a filtration at a temperature of preferably at least 60° C.

In a second alternative variant, a method is provided in which
- black liquor having a dry matter content of at least 20 mass % is subjected in a first process step (hydrothermal carbonization) to a hydrothermal carbonization, wherein
- the pH of the black liquor before, during, or of the carbonized black liquor after, the hydrothermal carbonization is reduced to the extent that undissolved carbonized lignin is extracted with a yield of at least 20 mass % and
- the grain size distribution of the undissolved carbonized lignin is adjusted by adapting the pH of the black liquor before and/or during the hydrothermal carbonization in such a manner that fine sediment of undissolved carbonized lignin forms and the carbonized black liquor after the hydrothermal carbonization has a pH of at least 7, preferably at least 8,
- the undissolved carbonized lignin in a second process step (dewatering) is substantially separated off from the carbonized black liquor at a pH of at least 7, preferably at least 8, and the carbonized black liquor is fed back to the alkaline fractionation method,
- the inorganic components of the undissolved carbonized lignin separated off from the carbonized black liquor are reduced in a third process step (purification) by a wash and
- the undissolved carbonized lignin is extracted with a dry matter content of greater than 40 mass %.

Preferably, in this case, the pH of the black liquor before the hydrothermal carbonization is >7, particularly preferably >8, and during the hydrothermal carbonization is between 7 and 11, particularly preferably between 8 and 10.

In this embodiment variant, by adjusting the pH of the black liquor, a fine sediment of undissolved carbonized lignin forms. For this purpose, preferably before the hydrothermal carbonization, a pH of >8 is to be provided. During the hydrothermal carbonization, preferably a pH between 8 and 11 is to be provided. This adjustment of the pH means that the formation of coarse particles by polymerization of the lignin during the hydrothermal carbonization is substantially suppressed. In addition, particle size distribution and the functional groups of the carbonized lignin are arranged in such a manner that a fine sediment of carbonized lignin forms.

In the context of the invention, in addition, the (intermediate) products forming by application of a method according to the invention, i.e. a solid carbon or undissolved carbonized lignin, and a carbonized black liquor, in each case having specific properties, are proposed.

The quality described hereinafter of the first product, of the undissolved carbonized lignin, is achieved in this case after the third process step of a method according to the invention, the purification. The quality described hereinafter of the second product, of the carbonized black liquor, is achieved after the second process step of a method according to the invention, the dewatering.

The first product according to the invention is characterized in that
- the fraction of the chemical element carbon based on the ash-free and dry mass is at least 60 mass %, for example at least 65 mass %, preferably at least 68 mass %,
- the fraction of the chemical element carbon based on the ash-free and dry mass is higher by at least 5 mass %, preferably by at least 8 mass %, than the fraction of the chemical element carbon of an ash-free and dry residue which is extracted in a complete evaporation of the black liquor used as starting material,
- the ash fraction based on the dry mass is a maximum of 10 mass %, for example a maximum of 7 mass %, preferably a maximum of 5 mass %,
- the ash fraction based on the dry mass is lower by at least 50 mass %, preferably at least 60 mass %, than the ash fraction of a dry residue which is extracted in a complete evaporation of the black liquor used as starting material,
- the softening temperature is at least 200° C. and
- the dry matter content is at least 40 mass %.

The first product according to the invention differs from lignin that is separated off from black liquor by the above-described two-step method (LignoBoost) according to the prior art in particular in that the fraction of the chemical element carbon and the softening temperature are each higher.

The second product according to the invention is characterized in that
- the fraction of the chemical element carbon of the ash-free and dry residue extracted from the carbonized black liquor is at least 60 mass %, for example at least 65 mass %, further preferably at least 68 mass %, and
- preferably the fraction of the chemical element carbon of an ash-free and dry residue extracted from the carbonized black liquor is higher by at least 5 mass %, preferably by at least 8 mass %, than the fraction of the chemical element carbon of an ash-free and dry residue that is extracted in a complete evaporation of the black liquor used as starting material.

The second product according to the invention differs from the black liquor that was separated off by the above-described two-step method according to the prior art in the first dewatering of black liquor in particular in that the fraction of the chemical element carbon and therefore the heating value at the same water content are higher.

BRIEF DESCRIPTION OF THE DRAWINGS

Example embodiments will be described and explained with additional specificity and detail through the use of the accompanying drawings in which.

SPECIFIC EXEMPLARY EMBODIMENTS

Hereinafter, further exemplary embodiments are explained which are additionally shown in more detail in the accompanying FIGS. 1 to 5.

Figure 1:
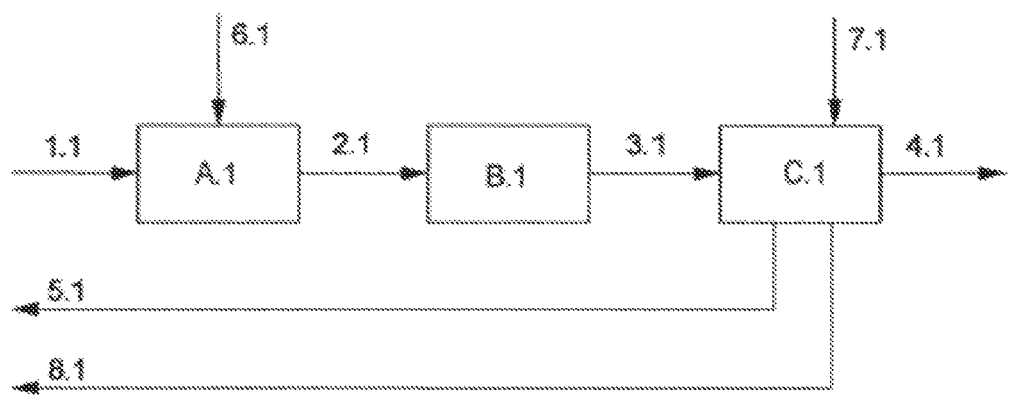
FIGS. 1-5 are schematic illustrations showing exemplary systems for extracting lignin from black liquor and products produced thereby.

Exemplary Embodiment 1 (FIG. 1)

In the exemplary embodiment 1, a method according to the invention for separating off and upgrading lignin from black liquor from an alkaline fractionation process according to the KRAFT method is employed in which pinewood is processed. As a result of the method, a fine sediment of undissolved carbonized lignin (solid carbon) is extracted with a yield of approximately 34 mass % or about 40 mass %. The exemplary embodiment is illustrated in FIG. 1.

The black liquor (1.1) is from the evaporation plant of the KRAFT method having a dry matter content of about 20 mass %. The pH of the black liquor is about 13. The lignin is dissolved in the black liquor.

First, the pH of the black liquor is lowered to about 10.5 by introducing $CO_2$ (6.1) in a device for lowering pH (A.1). The black liquor thus pretreated (2.1) is hydrothermally carbonized over a period of three hours and at a temperature of 250° C. in a hydrothermal carbonization (B.1, first process step). During the hydrothermal carbonization, carbonized lignin precipitates out of the black liquor. On account of the process procedure, lignin can also precipitate out of the black liquor before the hydrothermal carbonization in the device for lowering pH (A.1). The predominant part—about 70% of the yield of undissolved carbonized lignin that is extracted after mechanical dewatering in (C.1)—however precipitates out during the hydrothermal carbonization. The pH of the carbonized black liquor (3.1), after the hydrothermal carbonization, is about 9.5. The carbonized lignin is precipitated out of the black liquor as solid carbon. The solid carbon is separated off from the carbonized black liquor by a mechanical dewatering (C.1) in a filter press and in this manner a filter cake is extracted. The filtrate (5.1) extracted in this case is recirculated to the evaporation plant of the KRAFT method. Subsequently, the filter cake is washed with water (7.1). The wash water is likewise recirculated to the evaporation plant of the KRAFT method after the wash (8.1). The washed filter cake (4.1) consists of a fine sediment of undissolved carbonized lignin and remaining water and is discharged from the method.

The yield of undissolved carbonized lignin in this exemplary embodiment is about 34 mass %. The fraction of the chemical element carbon based on the organic dry matter of the undissolved carbonized lignin is about 70 mass %. The ash fraction of the undissolved carbonized lignin is about 7 mass %.

If in the same exemplary embodiment black liquor having a dry matter content of about 30 mass % is used with otherwise unchanged process procedure, then the yield of undissolved carbonized lignin increases to about 40 mass %. The fraction of the chemical element carbon based on the organic dry matter of the undissolved carbonized lignin is about 69 mass %. The ash fraction of the undissolved carbonized lignin is about 6 mass %.

Figure 2:
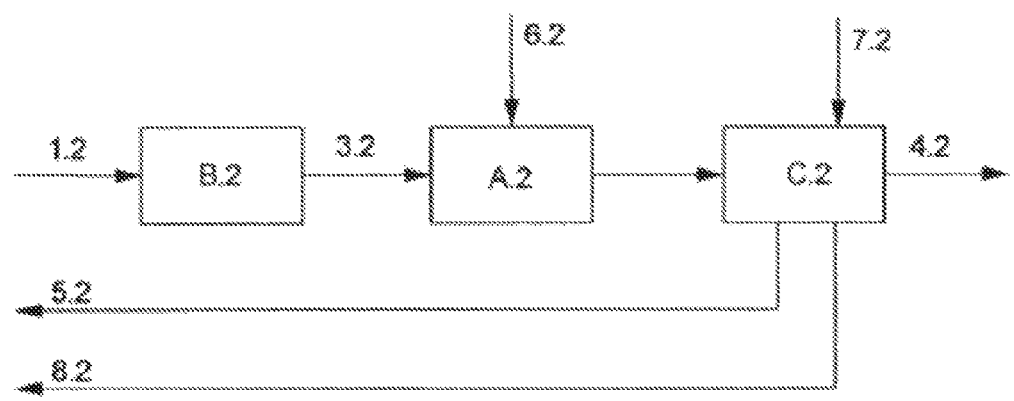

Exemplary Embodiment 2 (FIG. 2)

In exemplary embodiment 2, a method according to the invention for separating off and upgrading lignin from black liquor from an alkaline fractionation process according to the KRAFT method is employed, in which pinewood is processed. As a result of the method, a fine sediment of undissolved carbonized lignin (solid carbon) having a yield of about 25 mass % is extracted. The exemplary embodiment is illustrated in FIG. 2.

The black liquor (1.2) is taken off from the evaporation plant of the KRAFT method having a dry matter content of 20 mass %. The pH of the black liquor is about 13. The lignin is dissolved in the black liquor.

The black liquor (1.2) is hydrothermally carbonized in a hydrothermal carbonization (B.2) for a period of three hours and at a temperature of 250° C. The pH of the carbonized black liquor (3.2) after the hydrothermal carbonization is about 10.5. Subsequently the pH of the black liquor is lowered to about 8.5 by introducing $CO_2$ (6.2) in a device for lowering pH (A.2). Undissolved carbonized lignin is separated off from the carbonized black liquor by a mechanical dewatering (C.2) by filtration. The filtrate (5.2) extracted in this case is recirculated to the evaporation plant of the KRAFT method. Subsequently, the filter cake is washed with water (7.2). The wash water is likewise recirculated to the evaporation plant of the KRAFT method after the wash (8.2). The washed filter cake (4.2) consists of a fine sediment of undissolved carbonized lignin and remaining water and is discharged from the method.

The yield of undissolved carbonized lignin in this exemplary embodiment is about 25 mass %. The fraction of the chemical element carbon based on the organic dry matter of the undissolved carbonized lignin is about 70 mass %. The ash fraction of the undissolved carbonized lignin is about 6 mass %.

Exemplary Embodiment 3

In exemplary embodiment 2, a method according to the invention for separating off and upgrading lignin from black liquor from an alkaline fractionation process by the KRAFT method is employed, in which *eucalyptus* wood is processed. As a result of the method, undissolved carbonized lignin (solid carbon) is extracted at a yield of about 56 mass %.

13.34 g of black liquor having a dry matter content of 20.54% by mass (determined by drying the black liquor at 105° C.) are placed in an autoclave from Parr Instruments. The pH of the black liquor is 12.9. The autoclave is closed and heated to 250° C. After the heat-up phase, the temperature of the autoclave is kept at 250° C. for three hours. Subsequently, the autoclave is cooled back to ambient temperature and opened. The carbonized black liquor is filtered in a suction filter having a pore size of <2 µm. The filter cake has a dry matter content of 30%. The carbon that is filtered off is subsequently dried at 105° C. 1.11 g of solid and dry carbon is extracted in the form of undissolved carbonized lignin. The carbonized black liquor has a pH of 9.5. The fraction of the chemical elements carbon, hydrogen and nitrogen and ash content are determined not only of the residue formed in the drying of the black liquor but also of the dry carbon filtered off from the carbonized black liquor in an elemental analysis and are shown hereinafter.

|  | C | H | N | Ash |
|---|---|---|---|---|
| Black liquor, dry | 38.4 | 3.62 | 0.23 | 36.6 |
| Black liquor, dry and ash-free | 60.6 | 5.71 | 0.36 | — |
| Solid carbon, dry | 57.6 | 3.41 | 0.45 | 12.2 |
| Solid carbon, dry and ash-free | 65.6 | 3.88 | 0.51 | — |

Increase in the Carbon Fraction:
(65.6−60.6)/60.6=8.3%
Lowering of the Ash Fraction:
(36.6−12.2)/36.6=66.6%
Lowering in the pH:
12.9−9.5=3.4
Yield of Solid Carbon (Including Ash):
1.11 g/(13.34 g×20.54%)=1.11 g/2.74 g=40.5%
Yield of Solid Carbon (without Ash):
1.11g×(1−12.2%)/(13.34 g×20.54%×(1−36.6%))=56%

Subsequently the solid carbon was washed with sulfuric acid, wherein the ash content was reduced to 3.2%.
Lowering of the Ash Fraction after Acidic Wash:
(36.6−3.2)/36.6=91.3%

Exemplary Embodiment 4

Figure 3:
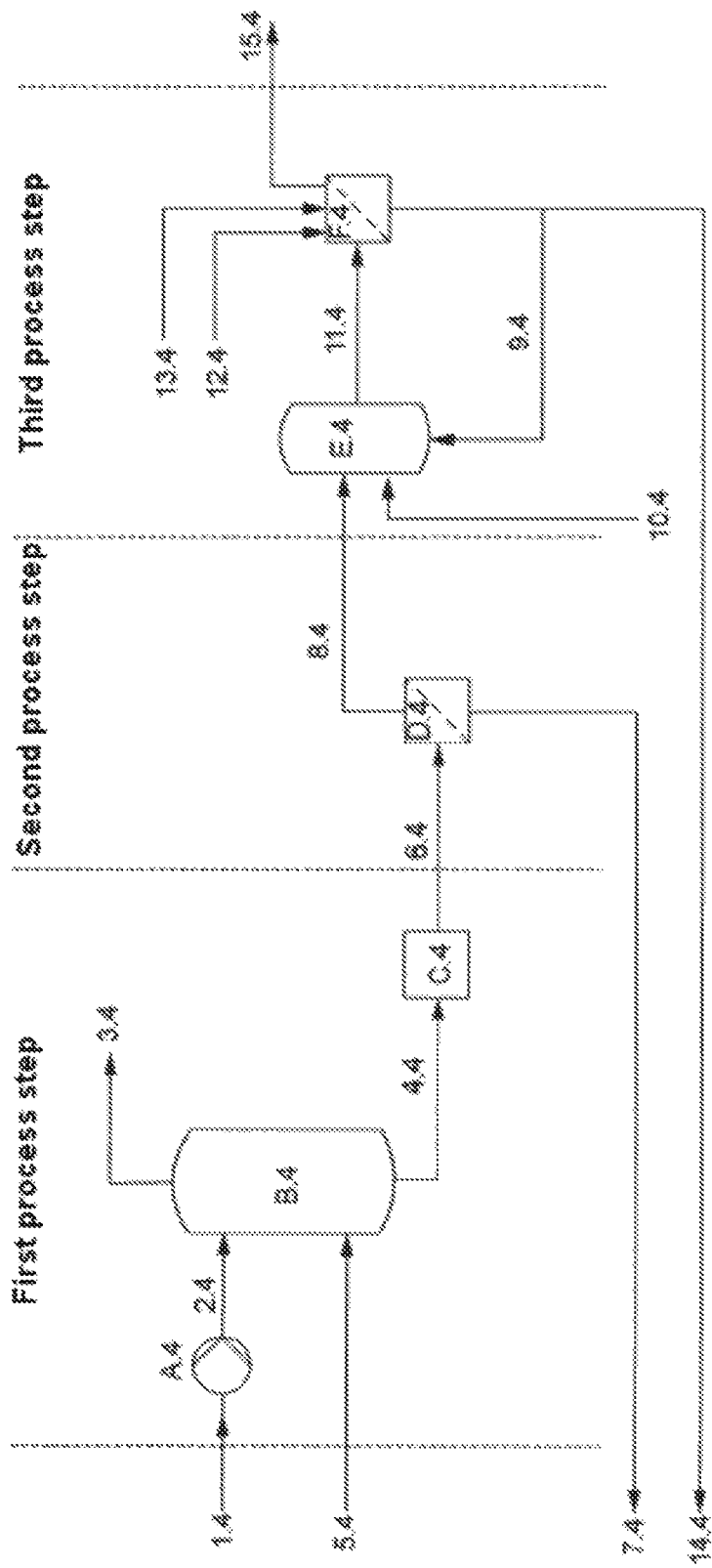

A further exemplary embodiment is shown in FIG. 3.

Black liquor (1.4) having a pH of 13 is taken off from the evaporation plant of a chemical pulp factory with 30 Mass % dry matter fraction and fed to the first process step. By means of a pump (A.4), the pressure is increased to about 30 bar and the black liquor (2.4) is fed to a reactor (B.4), in which the hydrothermal carbonization takes place at a temperature of 230° C. for a period of three hours. The reactor (B.4) is heated with heating steam (5.4). Process gases ($CO_2$, $CH_4$, CO, $H_2S$, etc.) formed during the reaction are passed out of the reactor (B.4) under pressure control as off-gas (3.4) and removed from the process. During the hydrothermal carbonization, undissolved carbonized lignin (solid carbon) precipitates out of the black liquor. The carbonized black liquor and the undissolved carbonized lignin (4.4) that is precipitated out are removed from the reactor (B.4) and expanded to ambient pressure in an expansion/heat-exchange device (C.4) and recooled to about 60° C. The carbonized black liquor and the undissolved carbonized lignin (6.4) that is precipitated out are then fed to a (first) dewatering, a membrane filter press (D.4) in the second process step. In the membrane filter press (D.4), a filter cake consisting of undissolved carbonized lignin and remaining carbonized black liquor is extracted. The carbonized black liquor (7.4) separated off from the filter cake is returned to the chemical pulp factory. The filter cake (8.4) is fed to the third process step and, in a device for mixing (E.4), is mixed with filtrates of a further (second) dewatering (9.4) and the pH is adjusted to 4 by adding an acid (10.4). The suspension (11.4) thus extracted consisting of undissolved carbonized lignin and the wash liquid is fed to the second dewatering (F.4) where a filter cake of solid carbon is extracted. The filter cake is then washed in a displacement wash by addition of water (12.4) and an acid (13.4). The wash liquid (14.4) is removed from the process. The washed filter cake is removed from the second dewatering (F.4) as undissolved carbonized lignin (15.4).

Exemplary Embodiment 5

Figure 4:
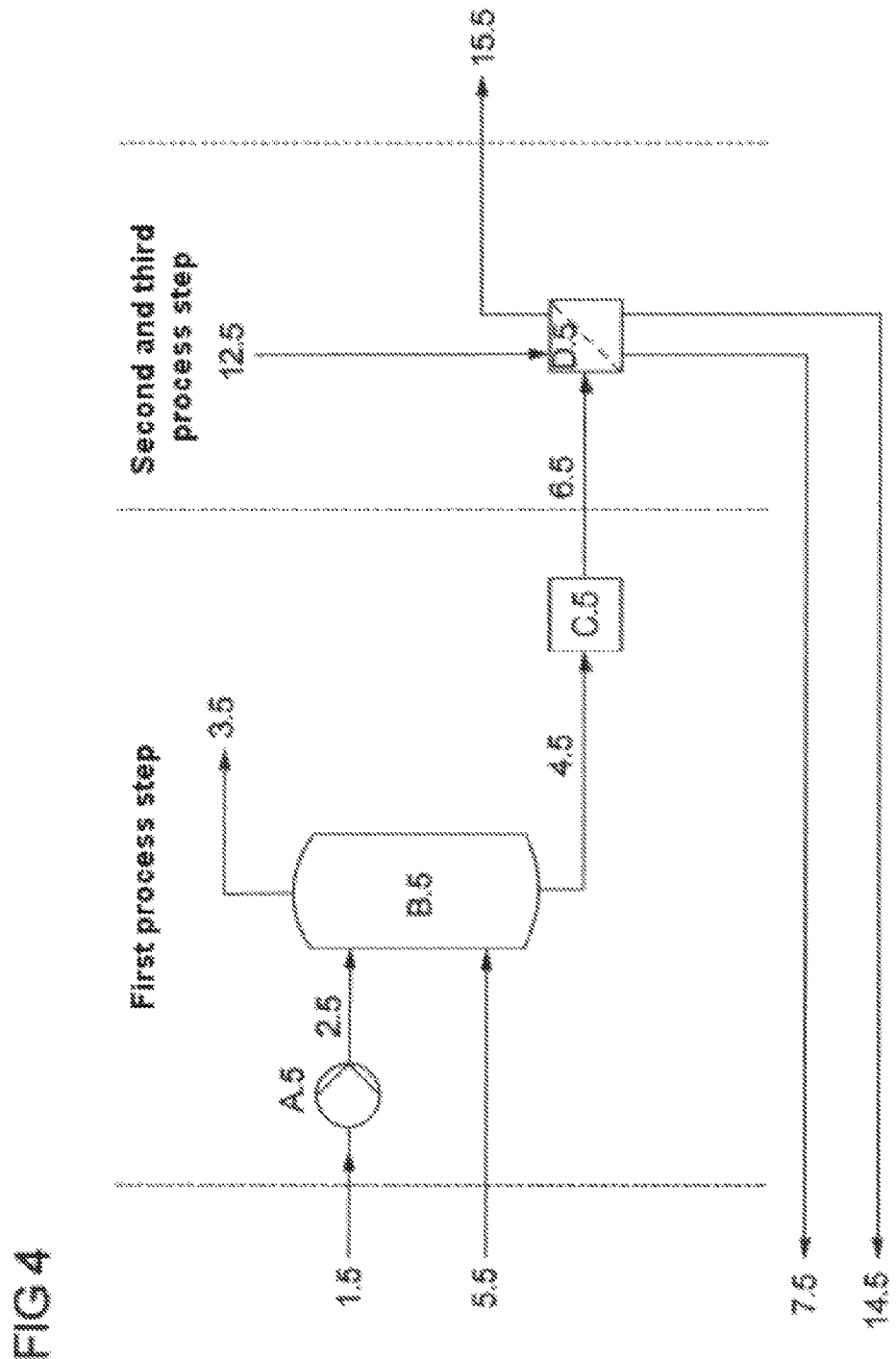

A further exemplary embodiment is shown in FIG. 4.

Black liquor (1.5) having a pH of 13 is taken off from the evaporation plant of a chemical pulp factory having 30 Mass % dry matter fraction and fed to the first process step. By means of a pump (A.5), the pressure is increased to about 30 bar and the black liquor (2.5) is fed to a reactor (B.5) in which the hydrothermal carbonization takes place at a temperature of 230° C. for a period of three hours. The reactor (B.5) is heated with heating steam (5.5) and the reaction temperature of 230° C. is thus established. Process gases ($CO_2$, $CH_4$, CO, $H_2S$, etc.) formed during the reaction are discharged from the reactor (B.5) under pressure control as off-gas (3.5) and removed from the process. During the hydrothermal carbonization, undissolved carbonized lignin precipitates out of the black liquor. The carbonized black liquor and the undissolved carbonized lignin (4.5) that is precipitated out are removed from the reactor (B.5) and expanded to ambient pressure in an expansion/heat-exchange device (C.5) and recooled to about 60° C. The carbonized black liquor and the undissolved carbonized lignin (6.5) that is precipitated out are then fed to the dewatering, a membrane filter press (D.5) in the second process step. In the membrane filter press (D.5), a filter cake consisting of solid carbon and remaining carbonized black liquor is extracted. The carbonized black liquor (7.5) separated off from the filter cake is returned to the chemical pulp factory. The filter cake is then washed in the third process step which is integrated into the second process step in the membrane filter press (D.5) in a displacement wash by addition of water (12.5). The wash liquid (14.5) is removed from the process. The washed filter cake is removed from the dewatering (D.5) as undissolved carbonized lignin (15.5).

Exemplary Embodiment 6

Figure 5:
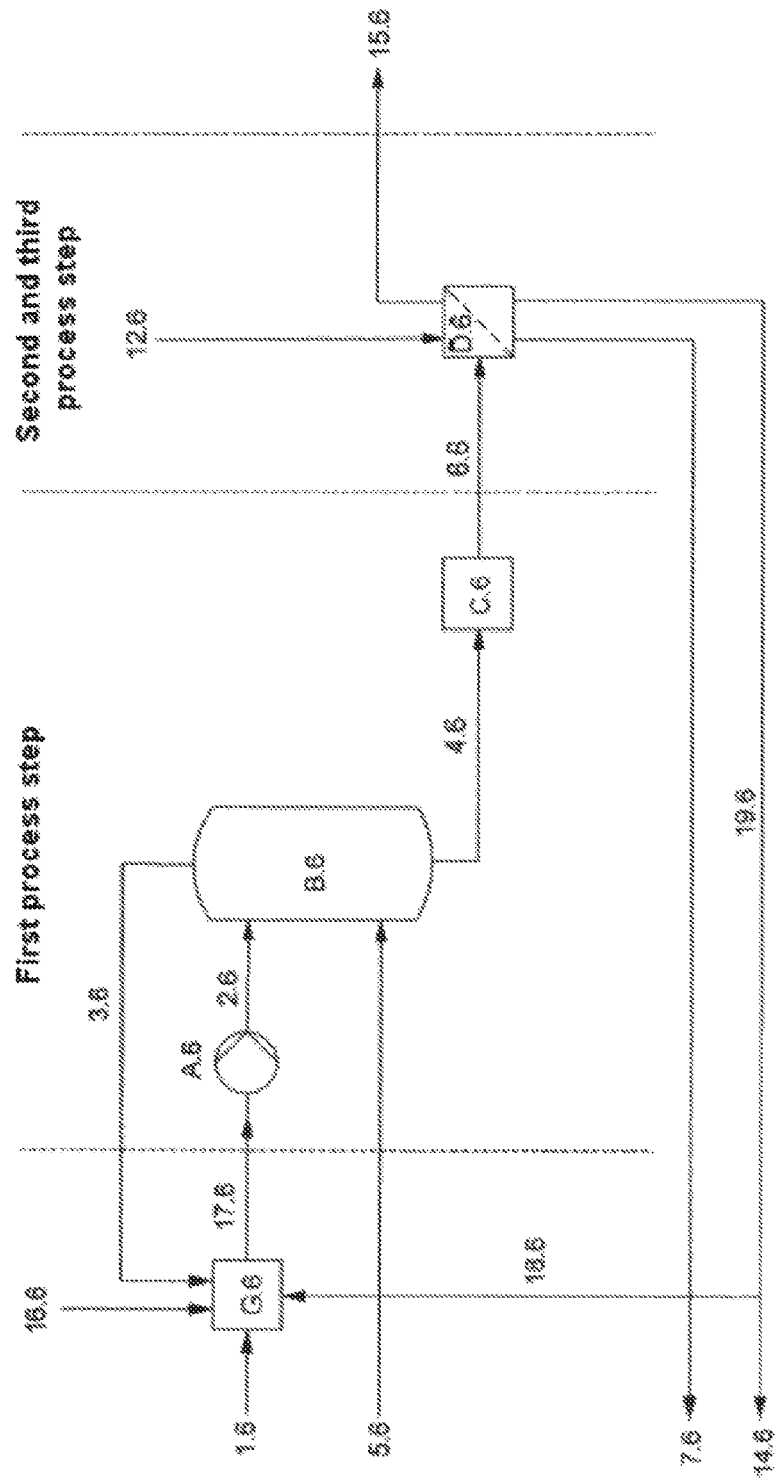

A further exemplary embodiment is shown in FIG. 5.

Black liquor (1.6) having a pH of about 13 is taken off from the evaporation plant of a chemical pulp factory having 40 mass % dry matter fraction and fed to a device for mixing and reducing the pH (G.6). In the device for mixing and reducing the pH (G.6) the black liquor is diluted with wash water (18.6) to a dry matter content of 30 mass % and the pH of the black liquor is adjusted to about 10.5 by introducing off-gas (3.6) and technical $CO_2$ (16.6). The black liquor (17.6) which is diluted and reduced in pH is fed to the first process step. By means of a pump (A.6), pressure is increased to about 30 bar and the black liquor (2.6) is fed to a reactor (B.6) in which the hydrothermal carbonization takes place at a temperature of 230° C. for a period of three hours. The reactor (B.6) is heated with heating steam (5.6) and the reaction temperature is thus adjusted to 230° C. Process gases ($CO_2$, $CH_4$, CO, $H_2S$, etc.) formed during the reaction are removed from the reactor (B.5) under pressure control as off-gas (3.6) and fed to the device for mixing and reducing the pH (G.6). During the hydrothermal carbonization, undissolved carbonized lignin precipitates out from the black liquor and the pH falls to about 9.5. The carbonized black liquor and the undissolved carbonized lignin (4.6) that is precipitated out are removed from the reactor (B.6) and expanded in an expansion/heat-exchange device (C.6) to ambient pressure and recooled to about 60° C. The carbonized black liquor and the undissolved carbonized lignin (6.6) that is precipitated out are subsequently fed to the dewatering, a membrane filter press (D.6) in the second process step. In the membrane filter press (D.6), a filter cake consisting of solid carbon and remaining carbonized black liquor is extracted. The carbonized black liquor (7.6) separated off from the filter cake is conducted back to the chemical pulp factory at a pH of about 9.5. The filter cake is subsequently washed in the third process step which is integrated into the second process step in the membrane filter press (D.6) in a displacement wash by addition of water (12.6). The pH of the water (12.6), before use thereof as wash water, was adjusted to a pH above 8. The wash liquid (19.6) is in part removed (14.6) from the process and is used in part for diluting the black liquor in the device for mixing and reducing the pH (G.6). The washed filter cake is removed as undissolved carbonized lignin (15.6) from the dewatering (D.6).

The invention clamed is:

1. A method for extracting undissolved carbonized lignin from black liquor from an alkaline fractionation process, wherein black liquor having a dry matter content of at least 20 mass% is subjected in a first process step to a hydrothermal carbonization in a temperature range between 210° C. and 270° C., wherein the pH of the black liquor, before or during the hydrothermal carbonization, or the pH of the carbonized black liquor after the hydrothermal carbonization, is reduced to the extent that undissolved carbonized lignin is extracted with a yield of at least 20 mass%, and the pH of the black liquor, before and during the hydrothermal carbonization, and the pH of the carbonized black liquor after the hydrothermal carbonization, are at least 7, the undissolved carbonized lignin in a second process step is substantially separated off from the carbonized black liquor and the carbonized black liquor is fed back to the alkaline fractionation process, the inorganic components of the undissolved carbonized lignin separated off from the carbonized black liquor are reduced in a third process step by a wash and the undissolved carbonized lignin is extracted with a dry matter content of greater than 40 mass%.

2. The method as claimed in claim 1, wherein an ash fraction of the undissolved carbonized lignin is lowered by the wash in the third process step to a maximum of 10 mass%.

3. The method as claimed in claim 2, wherein the undissolved carbonized lignin is washed in the third process step with water or an acid, in particular with sulfuric acid, and the ash fraction thereof is lowered in this manner.

4. The method as claimed in claim 1, wherein the pH of the black liquor before and during the hydrothermal carbonization and the pH of the carbonized black liquor after the hydrothermal carbonization are at least 8.

5. The method as claimed in claim 1, wherein the undissolved carbonized lignin is substantially separated off from the carbonized black liquor in the second process step at a pH of at least 7.

6. The method as claimed in claim 1, wherein the black liquor is fed in the first process step at a dry matter content of at least 25 mass%, in particular at least 30 mass%.

7. The method as claimed in claim 1, wherein the pH of the black liquor falls by at least one unit and at most to a pH of 8 during the hydrothermal carbonization.

8. The method for extracting undissolved carbonized lignin from black liquor as claimed in claim 1, wherein
black liquor having a dry matter content of at least 20 mass% from a chemical pulp factory is subjected in the first process step to a hydrothermal carbonization at a temperature between 210° C. and 270° C. for at least 60 minutes and for a maximum of 600 minutes, wherein the pH of the black liquor falls by at least one unit and at most to a pH of 8during the hydrothermal carbonization and
in this case undissolved carbonized lignin precipitates out of the black liquor at a yield of at least 20 mass%,
the undissolved carbonized lignin in the second process step is substantially separated off from the carbonized black liquor,
the carbonized black liquor is fed back to the chemical pulp factory,
the inorganic components of the undissolved carbonized lignin separated off from the carbonized black liquor are reduced in the third process step by a wash and the undissolved carbonized lignin is extracted with a dry matter content of more than 40 percent by mass.

9. The method as claimed in claim 1, wherein the period and/or temperature of the hydrothermal carbonization is selected in such a manner that the pH of the carbonized black liquor is below the pH of the black liquor before the hydrothermal carbonization by at least one unit.

10. The method as claimed in claim 1, wherein the period of the hydrothermal carbonization is selected in such a manner that the pH of the carbonized black liquor is at least 8.

11. The method as claimed in claim 1, wherein the yield of at least 20 mass% of undissolved carbonized lignin is at least 50% achieved during the hydrothermal carbonization.

12. The method as claimed in claim 1, wherein the undissolved carbonized lignin is substantially separated off from the carbonized black liquor in the second process step and a filter cake is removed.

13. The method as claimed in claim 1, wherein the third process step is implemented within the second process step as filter cake wash.

14. The method as claimed in claim 1, wherein the third process step is implemented subsequently to the second process step.

15. The method as claimed in claim 1, wherein the pH before the hydrothermal carbonization is reduced to the extent that lignin precipitates out of the black liquor.

16. The method as claimed in claim 1, wherein the pH is lowered during the hydrothermal carbonization by increasing the fraction of biomass in the black liquor before and/or during the hydrothermal carbonization.

17. The method as claimed in claim 1, wherein
the fraction of the chemical element carbon in the undissolved carbonized lignin based on the ash-free and dry mass is at least 60 percent by mass,
the fraction of the chemical element carbon in the undissolved carbonized lignin based on the ash-free and dry mass is higher by at least 5 percent by mass than the fraction of the chemical element carbon in an ash-free and dry residue which is extracted in a complete evaporation of the black liquor used as starting material,
the ash fraction of the undissolved carbonized lignin based on the dry mass is a maximum of 10 percent by mass,
the ash fraction of the undissolved carbonized lignin based on the dry mass is lower by at least 50 percent by mass than the ash fraction of the dry residue which is extracted in a complete evaporation of the black liquor used as starting material,
the softening temperature of the undissolved carbonized lignin is at least 200° C. and
the dry matter content of the undissolved carbonized lignin is at least 40 percent by mass.

18. The method as claimed in claim 1, wherein
the fraction of the chemical element carbon in an ash-free and dry residue extracted from the carbonized black liquor is at least 60 percent by mass and
the fraction of the chemical element carbon in an ash-free and dry residue extracted from the carbonized black liquor is higher by at least 5 percent by mass than the fraction of the chemical element carbon in an ash-free and dry residue which is extracted in a complete evaporation of the black liquor used as starting material.

* * * * *